(12) United States Patent
Bishop et al.

(10) Patent No.: US 7,312,707 B1
(45) Date of Patent: Dec. 25, 2007

(54) SYSTEM AND METHOD FOR AUTHENTICATING A RF TRANSACTION USING A TRANSACTION ACCOUNT ROUTING NUMBER

(75) Inventors: Fred Bishop, Glendale, AZ (US); Peter D Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 176 days.

(21) Appl. No.: 10/905,006

(22) Filed: Dec. 9, 2004

Related U.S. Application Data

(63) Continuation-in-part of application No. 10/711,720, filed on Sep. 30, 2004, and a continuation-in-part of application No. 10/708,545, filed on Mar. 10, 2004, and a continuation-in-part of application No. 10/340,352, filed on Jan. 10, 2003, and a continuation-in-part of application No. 10/192,488, filed on Jul. 9, 2002.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G08B 13/14* (2006.01)
(52) U.S. Cl. .............................. 340/572.1; 340/572.9; 340/5.52; 340/541; 705/17; 705/18; 343/726
(58) Field of Classification Search .. 340/572.1–572.9, 340/5.52, 5.6, 5.82, 10.1, 10.41, 541; 705/17, 705/18; 343/726
See application file for complete search history.

(56) References Cited

U.S. PATENT DOCUMENTS 4,303,904 A 12/1981 Chasek (Continued)

FOREIGN PATENT DOCUMENTS

CH 689070 1/1998

(Continued)

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

(Continued)

*Primary Examiner*—Benjamin C. Lee
*Assistant Examiner*—Daniel Previl
(74) *Attorney, Agent, or Firm*—Fitzpatrick, Cella, Harper & Scinto

(57) ABSTRACT

A system and method for securing a Radio Frequency (RF) transaction using a Radio Frequency Identification (RFID) transaction device are provided. A random number is transmitted from an RFID reader to an RFID transaction device, an RFID transaction device authentication tag is created in the RFID transaction device, using at least the random number, a routing number associated with a transaction account, and a stored counter value. The RFID transaction device authentication tag is transmitted to the RFID reader, the stored counter value in the RFID transaction device is incremented, and a transaction request for verification, which comprises the RFID transaction device authentication tag and the stored counter value, is transmitted and processed. Either the RFID transaction device authentication tag or the stored counter value, or both, are verified.

24 Claims, 6 Drawing Sheets

U.S. PATENT DOCUMENTS

| | | |
|---|---|---|
| 4,475,308 A | 10/1984 | Heise et al. |
| 4,583,766 A | 4/1986 | Wessel |
| 4,639,765 A | 1/1987 | dHont |
| 4,672,021 A | 6/1987 | Blumel et al. |
| 4,739,328 A | 4/1988 | Koelle et al. |
| 4,961,142 A | 10/1990 | Elliott et al. |
| 5,023,782 A | 6/1991 | Lutz et al. |
| 5,053,774 A * | 10/1991 | Schuermann et al. .... 340/10.34 |
| 5,101,200 A | 3/1992 | Swett |
| 5,197,140 A | 3/1993 | Balmer |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,285,100 A | 2/1994 | Byatt |
| 5,305,002 A | 4/1994 | Holodak et al. |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,371,896 A | 12/1994 | Gove et al. |
| 5,373,303 A | 12/1994 | dHont |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | dHont et al. |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,577,109 A | 11/1996 | Stimson et al. |
| 5,581,630 A * | 12/1996 | Bonneau, Jr. ............... 382/116 |
| 5,592,150 A | 1/1997 | dHont |
| 5,592,405 A | 1/1997 | Gove et al. |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A * | 6/1997 | Ruppert et al. ......... 235/462.46 |
| 5,646,607 A | 7/1997 | Schurmann et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,721,781 A | 2/1998 | Deo et al. |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,609 A | 6/1998 | Gove et al. |
| 5,774,882 A | 6/1998 | Keen et al. |
| 5,777,903 A | 7/1998 | Piosenka |
| 5,778,067 A | 7/1998 | Jones et al. |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |
| 5,797,060 A | 8/1998 | Thompson |
| 5,797,085 A | 8/1998 | Beuk et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,828,044 A | 10/1998 | Jun et al. |
| 5,834,756 A | 11/1998 | Gutman et al. |
| 5,835,894 A | 11/1998 | Adcock et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,854,891 A | 12/1998 | Postlewaite et al. |
| 5,858,006 A | 1/1999 | Van der AA et al. |
| 5,859,779 A | 1/1999 | Giordano et al. |
| 5,864,323 A | 1/1999 | Berthon |
| 5,867,100 A | 2/1999 | dHont |

| | | | | | | |
|---|---|---|---|---|---|---|
| 5,870,031 | A | 2/1999 | Kaiser et al. | 6,133,834 A | 10/2000 | Eberth et al. |
| 5,870,915 | A | 2/1999 | dHont | 6,141,651 A | 10/2000 | Riley et al. |
| 5,878,215 | A | 3/1999 | Kling et al. | 6,167,236 A | 12/2000 | Kaiser et al. |
| 5,878,403 | A | 3/1999 | DeFrancesco et al. | 6,177,860 B1 | 1/2001 | Cromer et al. |
| 5,880,675 | A | 3/1999 | Trautner | 6,179,205 B1 | 1/2001 | Sloan |
| 5,881,272 | A | 3/1999 | Balmer | 6,179,206 B1 | 1/2001 | Matsumori |
| 5,887,266 | A | 3/1999 | Heinonen et al. | 6,188,994 B1 | 2/2001 | Egendorf |
| 5,890,137 | A | 3/1999 | Koreeda | 6,192,255 B1 | 2/2001 | Lewis et al. |
| 5,898,783 | A | 4/1999 | Rohrbach | 6,198,728 B1 | 3/2001 | Hulyalkar et al. |
| 5,903,830 | A | 5/1999 | Joao et al. | 6,198,875 B1 | 3/2001 | Edenson et al. |
| 5,905,798 | A | 5/1999 | Nerlikar et al. | 6,202,927 B1 | 3/2001 | Bashan et al. |
| 5,912,678 | A | 6/1999 | Saxena et al. | 6,205,151 B1 | 3/2001 | Quay et al. |
| 5,920,628 | A | 7/1999 | Indeck et al. | 6,206,293 B1 | 3/2001 | Gutman et al. |
| 5,929,801 | A | 7/1999 | Aslanidis et al. | 6,215,437 B1 | 4/2001 | Schurmann et al. |
| 5,931,917 | A | 8/1999 | Nguyen et al. | 6,216,219 B1 | 4/2001 | Cai et al. |
| 5,933,624 | A | 8/1999 | Balmer | 6,219,439 B1 | 4/2001 | Burger |
| 5,943,624 | A | 8/1999 | Fox et al. | D442,627 S | 5/2001 | Webb et al. |
| 5,948,116 | A | 9/1999 | Aslanidis et al. | D442,629 S | 5/2001 | Webb et al. |
| 5,953,512 | A | 9/1999 | Cai et al. | 6,223,984 B1 | 5/2001 | Renner et al. |
| 5,955,717 | A | 9/1999 | Vanstone | 6,226,382 B1 | 5/2001 | MRaihi et al. |
| 5,955,969 | A | 9/1999 | dHont | 6,230,270 B1 | 5/2001 | Laczko, Sr. |
| 5,956,024 | A | 9/1999 | Strickland et al. | 6,232,917 B1 | 5/2001 | Baumer et al. |
| 5,963,924 | A | 10/1999 | Williams et al. | 6,233,683 B1 | 5/2001 | Chan et al. |
| 5,970,148 | A | 10/1999 | Meier | 6,237,848 B1 | 5/2001 | Everett |
| RE36,365 | E | 11/1999 | Levine et al. | 6,239,675 B1 | 5/2001 | Flaxl |
| 5,978,840 | A | 11/1999 | Nguyen et al. | 6,240,187 B1 | 5/2001 | Lewis |
| 5,983,208 | A | 11/1999 | Haller | 6,257,486 B1 | 7/2001 | Teicher et al. |
| 5,987,140 | A | 11/1999 | Rowney et al. | 6,259,769 B1 | 7/2001 | Page |
| 5,987,155 | A | 11/1999 | Dunn et al. | 6,260,026 B1 | 7/2001 | Tomida et al. |
| 5,987,498 | A | 11/1999 | Athing et al. | 6,260,088 B1 | 7/2001 | Gove et al. |
| 5,989,950 | A | 11/1999 | Wu | 6,264,106 B1 | 7/2001 | Bridgelall |
| 5,991,608 | A | 11/1999 | Leyten | 6,266,754 B1 | 7/2001 | Laczko, Sr. et al. |
| 5,991,750 | A | 11/1999 | Watson | 6,269,348 B1 | 7/2001 | Pare, Jr. et al. |
| 5,996,076 | A | 11/1999 | Rowney et al. | 6,273,335 B1 | 8/2001 | Sloan |
| 6,002,438 | A | 12/1999 | Hocevar et al. | 6,282,522 B1 | 8/2001 | Davis et al. |
| 6,002,767 | A | 12/1999 | Kramer | D447,515 S | 9/2001 | Faenza, Jr. et al. |
| 6,003,014 | A | 12/1999 | Lee et al. | 6,286,763 B1 | 9/2001 | Reynolds et al. |
| 6,005,942 | A | 12/1999 | Chan et al. | 6,289,324 B1 | 9/2001 | Kawan |
| 6,006,216 | A | 12/1999 | Griffin et al. | 6,315,193 B1 | 11/2001 | Hogan |
| 6,012,039 | A | 1/2000 | Hoffman et al. | 6,317,721 B1 | 11/2001 | Hurta et al. |
| 6,012,049 | A | 1/2000 | Kawan | 6,318,636 B1 | 11/2001 | Reynolds et al. |
| 6,012,636 | A | 1/2000 | Smith | 6,323,566 B1 | 11/2001 | Meier |
| 6,014,645 | A | 1/2000 | Cunningham | 6,325,285 B1 | 12/2001 | Baratelli |
| 6,018,717 | A | 1/2000 | Lee et al. | 6,326,934 B1 | 12/2001 | Kinzie |
| 6,024,286 | A | 2/2000 | Bradley et al. | 6,342,844 B1 | 1/2002 | Rozin |
| 6,029,149 | A | 2/2000 | Dykstra et al. | 6,364,208 B1 | 4/2002 | Stanford et al. |
| 6,038,584 | A | 3/2000 | Balmer | 6,367,011 B1 | 4/2002 | Lee et al. |
| 6,047,888 | A | 4/2000 | Dethloff | 6,374,245 B1 | 4/2002 | Park |
| 6,052,675 | A | 4/2000 | Checchio | 6,377,034 B1 | 4/2002 | Ivanov |
| 6,064,320 | A | 5/2000 | dHont et al. | 6,388,533 B2 | 5/2002 | Swoboda |
| 6,070,003 | A | 5/2000 | Gove et al. | 6,390,375 B2 | 5/2002 | Kayanakis |
| 6,072,870 | A | 6/2000 | Nguyen et al. | 6,400,272 B1 | 6/2002 | Holtzman et al. |
| 6,073,840 | A | 6/2000 | Marion | 6,402,028 B1 | 6/2002 | Graham, Jr. et al. |
| 6,078,888 | A | 6/2000 | Johnson, Jr. | 6,411,611 B1 | 6/2002 | Van der Tuijn |
| RE36,788 | E | 7/2000 | Mansvelt et al. | 6,415,978 B1 | 7/2002 | McAllister |
| 6,088,686 | A | 7/2000 | Walker et al. | 6,422,464 B1 | 7/2002 | Terranova |
| 6,092,057 | A | 7/2000 | Zimmerman et al. | 6,424,029 B1 | 7/2002 | Giesler |
| 6,101,174 | A | 8/2000 | Langston | 6,442,532 B1 | 8/2002 | Kawan |
| 6,102,162 | A | 8/2000 | Teicher | 6,457,996 B1 | 10/2002 | Shih |
| 6,102,672 | A | 8/2000 | Woollenweber | 6,466,804 B1 | 10/2002 | Pecen et al. |
| 6,105,008 | A | 8/2000 | Davis et al. | 6,473,500 B1 | 10/2002 | Risafi et al. |
| 6,105,013 | A | 8/2000 | Curry et al. | 6,480,100 B1 | 11/2002 | Frieden et al. |
| 6,105,865 | A | 8/2000 | Hardesty | 6,480,101 B1 | 11/2002 | Kelly et al. |
| 6,109,525 | A | 8/2000 | Blomqvist et al. | 6,481,621 B1 | 11/2002 | Herrendoerfer et al. |
| 6,112,152 | A | 8/2000 | Tuttle | 6,481,632 B2 | 11/2002 | Wentker et al. |
| 6,115,360 | A | 9/2000 | Quay et al. | 6,483,929 B1 | 11/2002 | Murakami et al. |
| 6,116,423 | A | 9/2000 | Troxtell, Jr. et al. | 6,484,937 B1 | 11/2002 | Devaux et al. |
| 6,116,505 | A | 9/2000 | Withrow | 6,490,443 B1 | 12/2002 | Freeny, Jr. |
| 6,118,189 | A | 9/2000 | Flaxl | 6,491,229 B1 | 12/2002 | Berney |
| 6,121,544 | A | 9/2000 | Petsinger | 6,494,380 B2 | 12/2002 | Jarosz |
| 6,123,223 | A | 9/2000 | Watkins | 6,507,762 B1 | 1/2003 | Amro et al. |
| 6,129,274 | A | 10/2000 | Suzuki | 6,510,983 B2 | 1/2003 | Horowitz et al. |
| 6,130,623 | A * | 10/2000 | MacLellan et al. .......... 340/5.1 | 6,510,998 B1 | 1/2003 | Stanford et al. |

| | | |
|---|---|---|
| 6,513,015 B2 | 1/2003 | Ogasawara |
| 6,519,565 B1 | 2/2003 | Clements et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,626,356 B2 | 9/2003 | Davenport et al. |
| 6,628,961 B1 | 9/2003 | Ho et al. |
| 6,650,887 B2 | 11/2003 | McGregor et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,674,786 B1 | 1/2004 | Nakamura et al. |
| 6,679,427 B1 | 1/2004 | Kuroiwa |
| 6,681,328 B1 * | 1/2004 | Harris et al. ............... 713/175 |
| 6,684,269 B2 | 1/2004 | Wagner |
| 6,686,847 B1 * | 2/2004 | Mittler ................... 340/815.4 |
| 6,687,714 B1 | 2/2004 | Kogen et al. |
| 6,690,930 B1 | 2/2004 | Dupre |
| 6,705,530 B2 | 3/2004 | Kiekhaefer |
| 6,711,262 B1 | 3/2004 | Watanen |
| 6,732,936 B1 | 5/2004 | Kiekhaefer |
| 6,760,581 B2 | 7/2004 | Dutta |
| 6,789,012 B1 | 9/2004 | Childs et al. |
| 2001/0013542 A1 | 8/2001 | Horowitz et al. |
| 2001/0024157 A1 | 9/2001 | Hansmann et al. |
| 2001/0032192 A1 * | 10/2001 | Putta et al. ................... 705/76 |
| 2001/0034565 A1 | 10/2001 | Leatherman |
| 2001/0039617 A1 | 11/2001 | Buhrlen et al. |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenburg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0010462 A1 | 1/2004 | Moon et al. |
| 2004/0015451 A1 | 1/2004 | Sahota et al. |
| 2004/0020982 A1 | 2/2004 | Hoffman et al. |
| 2004/0029569 A1 | 2/2004 | Khan et al. |
| 2004/0039860 A1 | 2/2004 | Mills et al. |
| 2004/0139021 A1 | 7/2004 | Reed et al. |

FOREIGN PATENT DOCUMENTS

| | | |
|---|---|---|
| EP | 0 358 525 A2 | 3/1990 |
| EP | 0 424 726 A1 | 10/1990 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| JP | 2000-1109 A | 1/2000 |
| JP | 2000-015288 A | 1/2000 |
| JP | 2000-40181 A | 2/2000 |
| JP | 2000-67312 A | 3/2000 |
| JP | 2000-207641 A | 7/2000 |
| JP | 2001-5931 A | 1/2001 |
| JP | 2001-283122 A | 10/2001 |
| WO | WO 99/03057 A1 | 1/1999 |
| WO | WO 00/10144 A1 | 2/2000 |
| WO | WO 00/38088 A1 | 6/2000 |

| | | |
|---|---|---|
| WO | WO 01/04825 A1 | 1/2001 |
| WO | WO 01/15098 A1 | 3/2001 |
| WO | WO 01/43095 A2 | 6/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065404 A2 | 8/2002 |
| WO | WO 02/265246 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |

OTHER PUBLICATIONS

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobile Singapore Rolls Out Asia's First RFID-Based Pay-At-The-Pump System", Press Release, Apr. 5, 1999, http://www.ti.com/tiris/docs/news_releases/rell2.htm (3 pages).

"Speedpass Unleashed", Jun. 4, 2002, http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its Quick Wave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocesssor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 02, 2003.

"RFID Smart Cards Gain Ground: The convenience of contactless transactions is driving widespread adoption of contactless smart cards", RFID Journal, Apr. 09, 2003.

"TI Embarces Prox Card Standard: Texas Instruments ISO 14443 payment platform promises faster data transfer rates and more security", RFID Journal, Mar. 06, 2003.

"Multiple Frequency Transponders: Volume production of dual-band RFID chips begins", Frontline Solutions, Jul. 16, 2003.

Functional Specification, Standard Card IC MFI IC S50, Philips Semiconductors, Product Specification Rev. 5.1 May 2001.

"Biometrics: Speaker Verification", by Kulkarni, et al., http://biometrics.cse.msu.edu/speaker.html, Mar. 8, 2004, 5 pages.

"Judge Dismisses FTC Suit Against Rambus", Evers, IDG New Service, http://www.infoworld.com/article/04/02/18/HNjudgedismisses_1.html, Feb. 18, 2004, 3 pages.

"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.

"The Evolution of Mobile Payment", by McPherson, Financial Insights, Feb. 02, 2004, http://www.banktech.com./story/news/showArticle/jhtml?article ID=17601432, 2 pages.

"RFID Take Priority With Wal-Mart",by DocMemory, http://www.simmtester.com/page/news/shownews.asp?num=6550, Feb. 09, 2004, 2 pages.

"Microsoft, IBM and Phillips Test RFID Technology", by Rohde, IDG New Service, http:www.computerweekly.com/Article127889.htm, Feb. 09, 2004, 3 pages.

"Pay By Touch Press Releases", http://www.paybytouch.com/press.html, Feb. 10, 2004, 3 pages.

"PowerPay RFID Payment and Marketing Solution Speeds Purchases at Seahawks Stadium with Technology from Texas Instruments", http://www.powerpayit.com/news/Seahawks¯pr.html, Feb. 09, 2004, 2 pages.

"Putting Their Finger on It", by Wilson, http://sanfrancisco.bizjournals.com/sanfrancisco/stories/2003/10/20/story6.html?t=printable, Feb. 09, 2004, 2 pages.

"TI Embraces Prox Card Standard", by Roberti, Mar. 06, 2003, http://www.ti.com/tiris/docs/in-the-news/2003/3-6-03.shtml, 2 pages.

"Paying It By Ear", The Guardian, Jan. 18, 2003, http://money.guardian.co.uk/creditanddebt/creditcards/story/0,1456,876908,00.html,3 pages.

"International Biometric Group—Signature Biometrics: How It Works", http://www.ibgweb.com./reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"Individual Biometrics—Hand Geometry", http://ctl.ncsc.dni.us/biomet%20web/BMHand.html, Feb. 18, 2004, 2 pages.

"Individual Biometrics—Retinal Scan", http:ctl.ncsc.dni.us/biomet%20web/BMRetinal.html, Feb. 18, 2004, 2 pages.

"Individual Biometrics—Iris Scan", http:ctl.ncsc.dni.us/biomet%20web/BMIris.html, Feb. 18, 2004, 2 pages.

"Individual Biometrics—Vascular Patterns", http:ctl.ncsc.dni.us/biomet%20web/BMVascular.html, Feb. 18, 2004, 1 page.

"Individual Biometrics—Fingerprint", http:ctl.ncsc.dni.us/biomet%20web/BMFingerprint.html, Feb. 18 ,2004, 3 pages.

"Fingerprint Technology—Indentix Inc.—Empowering IdentificationO—Understanding Biometrics", http://www.identix.com/newsroom/news_biometrics_finger.html, Feb. 18, 2004, 1 page.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

* cited by examiner

SYSTEM AND METHOD FOR AUTHENTICATING A RF TRANSACTION USING A TRANSACTION ACCOUNT ROUTING NUMBER

CROSS-REFERENCE TO RELATED APPLICATIONS

This invention is a continuation-in-part of and claims priority to U.S. patent application Ser. No. 10/711,720, titled "SYSTEMS AND METHODS FOR MANAGING MULTIPLE ACCOUNTS ON A RF TRANSACTION DEVICE USING SECONDARY IDENTIFICATION INDICIA," filed Sep. 30, 2004, this application is also a continuation-in-part of and claims priority to U.S. patent application Ser. No. 10/708,545, titled "SYSTEM AND METHOD FOR SECURING RF TRANSACTIONS USING A RADIO FREQUENCY IDENTIFICATION DEVICE INCLUDING A TRANSACTION COUNTER," filed Mar. 10, 2004. Both the '720 and '545 applications themselves claim priority to U.S. Provisional Application No. 60/507,803, filed Sep. 30, 2003; to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002); and to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001). All of the above listed applications are incorporated herein by reference.

FIELD OF INVENTION

This invention generally relates to a system and method for securing a Radio Frequency (RF) transaction using a RF operable transaction device, and more particularly, to securing a RF transaction using a Radio Frequency Identification (RFID) device module including a transactions counter.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in portable devices are identifiable by hand. For example, RFID modules are being placed in a fob or tag for use in completing financial transactions. A typical fob includes a RF transponder and is ordinarily a self-contained device which may be contained on any portable form factor. In some instances, a battery may be included with the fob to power the transponder, in which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal provided by a RF reader. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. These are called "passive" RFID devices. Alternatively, the fob may have an internal power source such that interrogation by the reader to activate the fob is not required. These RFID devices are termed "active" RFID devices.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point-of-Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity, such as for example an "acquirer" or account issuer. Once the server receives authorization from the authorizing entity, the authorizing entity sends clearance to the point-of-sale device for completion of the transaction.

Minimizing fraud transactions in the RFID environment is typically important to the account issuer to lessen the loss associated with fraudulent RFID transaction device usage. One conventional method for securing RFID transactions involves requiring the device user to provide a secondary form of identification during transaction completion. For example, the RFID transaction device user may be asked to enter a personal identification number (PIN) into a keypad. The PIN may then be verified against a number associated with the user or the RFID transaction device, where the associated number is stored in an account issuer database. If the PIN number provided by the device user matches the associated number, then the transaction may be cleared for completion.

One problem with the conventional method of securing an RFID transaction is that the time for completing the transaction is increased. This is true since the RFID device user must delay the transaction to provide the alternate identification. The increased time for completing a transaction defeats one real advantage of the RFID transaction device, which is to permit expedient completion of a transaction since the account information may be passed to a reader without merchant involvement.

As such, a need exists for a method of securing RFID transaction which does not increase the time needed to complete a transaction, and which method may be used without device user intervention.

SUMMARY OF INVENTION

Described herein is a system and method for securing RFID transactions which addresses the problems found in conventional transaction securing methods.

The invention discloses a system and method for facilitating securing a radio frequency identification (RFID) transaction. The method involves (1) transmitting a random number from an RFID reader to an RFID transaction device, (2) creating, in the RFID transaction device, an RFID transaction device authentication tag using at least the random number, a routing number associated with a transaction account, and a stored counter value, (3) transmitting the RFID transaction device authentication tag to the RFID reader, (4) incrementing the stored counter value in the RFID transaction device, (5) transmitting a transaction request for verification, the transaction request being formed from at least the RFID transaction device authentication tag and the stored counter value, and (6) processing the transaction request, wherein at least one of the RFID transaction device authentication tag and the stored counter value is verified.

The system according to the present invention is configured to facilitate securing an RFID transaction. The system includes an RFID transaction device, an RFID reader and an issuer system. The RFID transaction device includes (1) an RFID transaction device database, the RFID transaction device database is configured to store transaction account payload data, a routing number associated with a transaction account, (2) an RFID transaction device counter, the RFID transaction device counter having a stored counter value, and (3) an RFID transaction device processor, the RFID transaction device processor being configured to receive a random number, create an RFID transaction device authentication tag using at least (a) the random number, (b) the routing number, and (c) the stored counter value, transmit the RFID transaction device authentication tag, and increment the stored counter value. The RFID reader is configured to (1) transmit the random number to the RFID transaction device, (2) receive the RFID transaction device authentication tag from the RFID transaction device, and (3) transmit at least the RFID transaction device authentication tag and the stored counter value. The issuer system is configured to (1) receive a transaction request, the transaction request being formed from at least the RFID transaction device authentication tag and the stored counter value, and (2) process the transaction request, wherein the issuer system verifies at least one of the RFID transaction device authentication tag and the stored counter value.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAIL DESCRIPTION

Figure 1:
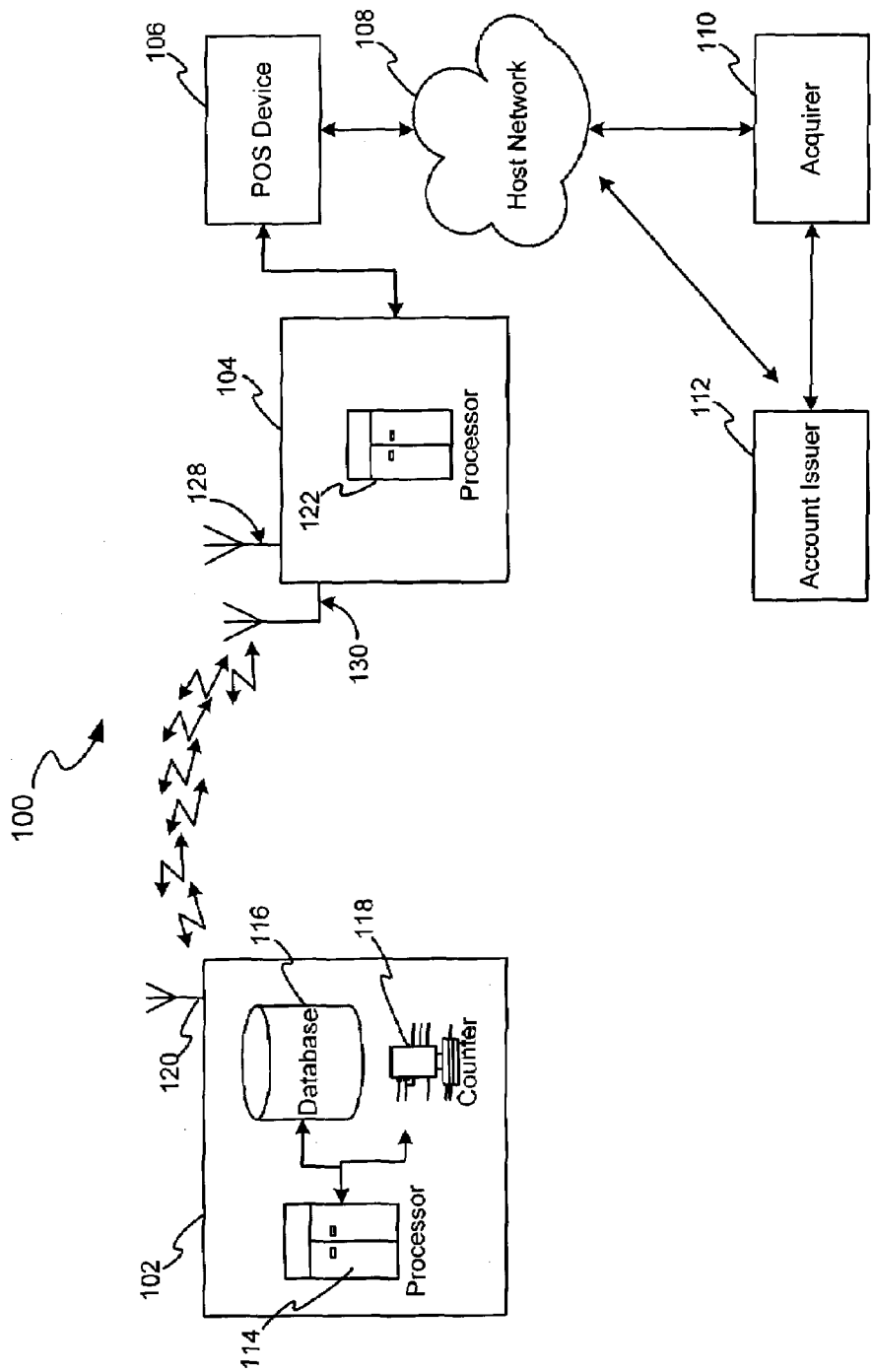
FIG. 1 illustrates an exemplary RFID-based system depicting exemplary components for use in RFID transaction completion in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It is noted that the network may be implemented as other types of networks, such as an interactive television network (ITN).

Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997); Loshin, TCP/IP Clearly Explained (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, kiosk, personal digital assistant, handheld computer (e.g., Palm Pilot®, Blueberry®), cellular phone and/or the like). Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including POS device 106 and host network 108 may reside on a local area network which interfaces to a remote network (not shown) for remote authorization of an intended transaction. POS 106 may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard, or the like.

To facilitate understanding, the present invention may be described with respect to a credit account. However, it should be noted that the invention is not so limited and other accounts permitting an exchange of goods and services for an account data value is contemplated to be within the scope of the present invention.

A transaction device identifier may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. These first five to seven digits may be termed the "routing number," herein. The routing number may ordinarily be included in the account number for use in indicating the transaction completion transmission route to corresponding to an account issuer, funding source, or the like. Ordinarily, the routing number may not be used for payment. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to the RFID transaction device.

In one exemplary embodiment, the transaction device identifier may include a unique RFID transaction device serial number and user identification number, as well as specific application applets. The transaction device identifier may be stored on a transaction device database located on the transaction device. The transaction device database may be configured to store multiple account numbers issued to the RFID transaction device user by the same or different account providing institutions. In addition, where the device identifier corresponds to a loyalty or rewards account, the RFID transaction device database may be configured to store the attendant loyalty or rewards points data.

The merchant database locations maintained on database 116 by server 110 are provided a distinct merchant identifier. Database discussed herein may be a graphical, hierarchical, relational, object-oriented or other database, and may be maintained on a local drive of a server or on a separate computer coupled to the server via a local area or other network (not shown). In one embodiment, databases disclosed are a collection of ASCII or other text files stored on a local drive of server. Database information is suitably retrieved from the database and provided to transaction processing systems upon request via a server application, as described more fully below.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For instance, one skilled in the art will appreciate that the RFID transaction device and the RFID reader disclosed herein include traditional transponders, antennas, protocol sequence controllers, modulators/demodulators and the like, necessary for proper RFID data transmission. As such, those components are contemplated to be included in the scope of the invention.

It should be noted that the transfer of information in accordance with this invention, may be done in a format recognizable by a merchant system or account issuer. In that regard, by way of example, the information may be transmitted in magnetic stripe or multi-track magnetic stripe format. Because of the proliferation of devices using magnetic stripe format, the standards for coding information in magnetic stripe format were standardized by the International Standards Organization (ISO).

Typically, magnetic stripe information is formatted in three tracks. Certain industry information must be maintained on certain portion of the tracks, while other portions of the tracks may have open data fields. The contents of each track and the formatting of the information provided to each track is controlled by ISO standard ISO/IEC 7811. For example, the information must typically be encoded in binary. Track 1 is usually encoded with user information (name) in alphanumeric format. Track 2 is typically comprised of discretionary and non-discretionary data fields. In one example, the non-discretionary field may comprise 19 characters and the discretionary field may comprise 13 characters. Track 3 is typically reserved for financial transactions and includes enciphered versions of the user's personal identification number, country code, currenty units amount authorized per cycle, subsidiary accounts, and restrictions.

As such, where information is provided in accordance with this invention, it may be provided in magnetic stripe format track. For example, the counter values, authentication tags and encrypted identifiers, described herein, may be forwarded encoded in all or a portion of a data stream representing data encoded in, for example, track 2 or track 3 format.

Further still, various components may be described herein in terms of their "validity." In this context, a "valid" component is one which is authorized for use in completing a transaction request in accordance with the present invention. Contrarily, an "invalid" component is one which is not authorized for transaction completion. In addition, an invalid component may be one which is not recognized as being permitted for use on the secure RF system described herein.

FIG. 1 illustrates an exemplary secure RFID transaction system 100 in accordance with the present invention, wherein exemplary components for use in completing a RF transaction are depicted. In general, system 100 may include a RFID transaction device 102 in RF communication with a RFID reader 104 for transmitting data there between. RFID reader 104 may be in further communication with a merchant point-of-sale (POS) device 106 for providing to POS 106 data received from RFID transaction device 102. POS 106 may be in further communication with an acquirer 110 or an account issuer 112 via a host network 108 for transmitting a transaction request, including information received from RFID reader 104, and receiving authorization concerning transaction completion.

Although the point-of-interaction device (POS) is described herein with respect to a merchant point-of-sale (POS) device, the invention is not to be so limited. Indeed, a merchant POS device is used herein by way of example, and the point-of-interaction device may be any device capable of receiving transaction device account data. In this regard, the POS may be any point-of-interaction device enabling the user to complete a transaction using a transaction device 102. POS device 106 may receive RFID transaction device 102 information and provide the information to host network 108 for processing. In one exemplary embodiment, POS device 106 may receive the transaction device information in ISO/IEC 8583 message format from RFID reader 104.

As used herein, an "acquirer" may be a third-party entity including various databases and processors for facilitating the routing of the transaction request to an appropriate account issuer 112. Acquirer 112 may route the request to the account issuer in accordance with a routing number provided by RFID transaction device 102. The "routing number" in this context may be a unique network address or any similar device for locating an account issuer 112 on a network 108. Traditional means of routing the payment request in accordance with the routing number are well understood. As such, the process for using a routing number to provide the payment request will not be discussed herein for brevity.

Additionally, account issuer 112 ("account provider" or "issuer system") may be any entity which provides a transaction account for facilitating completion of a transaction request. The transaction account may be any credit, debit, loyalty, direct debit, checking, or savings, or the like. The term "issuer" or "account provider" may refer to any entity facilitating payment of a transaction using a transaction device, and which includes systems permitting payment using at least one of a preloaded and non-preloaded transaction device. Typical issuers may be American Express, MasterCard, Visa, Discover, and the like. In the preloaded value processing context, an exchange value (e.g., money, rewards points, barter points, etc.) may be stored in a preloaded value database (not shown) for use in completing a requested transaction. The preloaded value database and thus the exchange value may not be stored on the transaction device itself, but may be stored remotely, such as, for example, at account issuer 112 location. Further, the preloaded value database may be debited the amount of the transaction requiring the value to be replenished. The preloaded value may be any conventional value (e.g., monetary, rewards points, barter points, etc.) which may be exchanged for goods or services. In that regard, the preloaded value may have any configuration as determined by issuer system 112.

In general, during operation of secure system 100, RFID reader 104 may provide an interrogation signal to transaction device 102 for powering device 102 and receiving transaction device related data. The interrogation signal may be received at a transaction device antenna 120 and may be further provided to a transponder (not shown). In response, a transaction device processor 114 may retrieve a transaction device identifier from a transaction device database 116 for providing to RFID reader 104 to complete a transaction request. Typically, the transaction device identifier may be encrypted prior to providing the device identifier to a modulator/demodulator (not shown) for providing the identifier to RFID reader 104.

It should be noted that RFID reader 104 and RFID transaction device 102 may engage in mutual authentication prior to transferring any transaction device 102 data to RFID reader 104. For a detailed explanation of a suitable mutual authentication process for use with the invention, please refer to commonly owned U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, incorporated by reference in its entirety.

In accordance with one embodiment of the present invention, a RF transaction using a RFID transaction device is secured by limiting the number of transactions which may be performed with a particular transaction device. Once the maximum transactions value is reached, the transaction device may automatically disable itself against further usage. Alternatively, account issuer 112 may flag the transaction account correlating to the transaction device such that the account issuer system automatically prevents completion of transactions using the transaction device As such, RFID transaction device 102 in accordance with the present invention further includes a counter 118 for recording and reporting the number of transactions performed with a particular transaction device 102. Counter 118 may be any device capable of being initiated with a beginning value and incrementing that value by a predetermined amount when the transaction device 102 is presented for completion of a transaction. Counter 118 may be a discrete electronic device on the transponder, or may be software or code based counter as is found in the art.

The initial counter value may be any value from which other similar values may be measured. The value may take any form, such as, alpha, numeric, a formation of symbols, or any combination thereof.

To facilitate understanding, the following description discusses all values to be in numeric units (0, 1, 2, 3 . . . n). Thus, the counter values, the value amount to be incremented, the total transactions counted value, and the maximum transactions value, are all whole numbers.

It should be noted that account issuer 112 may preset the initial counter value at any initial value as desired. Account issuer 112 may also predetermine the value amount to be incremented by counter 118 when the transaction device is used to complete a transaction. Further, account issuer 112 may assign different values to be incremented for each distinct transaction device 102. Further still, account issuer 112 may determine the maximum transactions value, which may be particular to each individual transaction device 102 issued by account issuer 112. Where counter 118 value equals a maximum transactions value, the system 100 prevents the usage of transaction device 102 to complete additional transactions. Account issuer 112 may prevent the usage of transaction device 102 where account issuer 112 flags the transaction account corresponding to transaction device 102, thereby preventing authorization for using the account to complete transactions. Alternatively, transaction device 102 may self-disable. For example, counter 118 value may trigger transaction device processor 114 to provide a signal for preventing the transfer of transaction device 102 identifier.

For example, account issuer 112 may preset the initial counter value at 5 units and the counter value to be incremented at 10 units per transaction. Account issuer 112 may determine that transaction device 102 may be used to complete a total transaction value of 20 transactions. Since counter 118 increments the counter value by the value to be incremented (e.g., 10 units) for each transaction, then for a total of 20 transactions permitted, the maximum transactions value will be 205 units. Once the counter value equals 205 units, then the operation of transaction device 102 is disabled.

Figure 2:
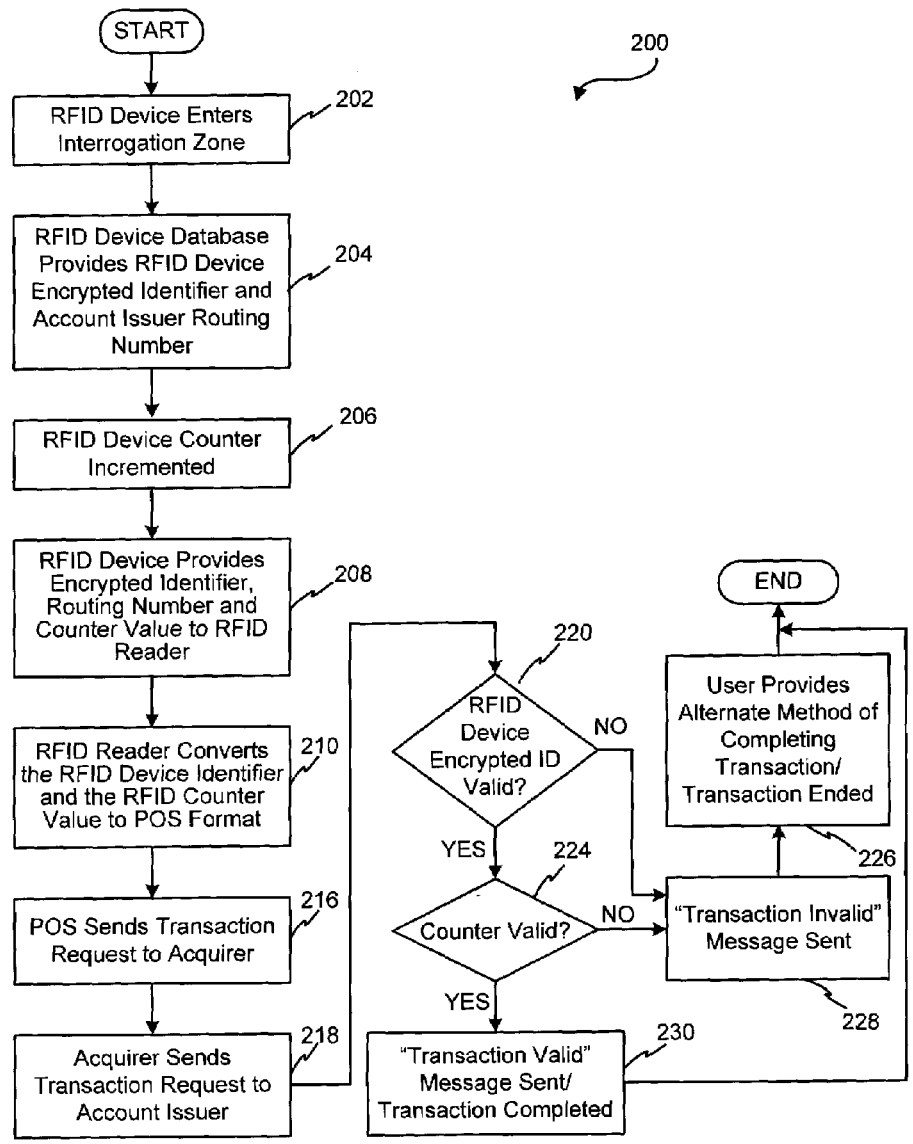
FIG. 2 illustrates an exemplary method for securing a RFID transaction using a counter-generated indicia in accordance with the present invention.

The operation of the exemplary embodiment described above, may be understood with reference to FIG. 1 and to the method of securing a RFID transaction described in FIG. 2. The operation may begin when RFID transaction device 102 is presented for completion of a transaction. Transaction device 102 may be placed in an interrogation field generated by RFID reader 104 (step 202). RFID reader 104 may interrogate RFID transaction device 102 enabling transaction device 102 operation. In response, RFID transaction device 102 may retrieve the transaction device 102 identifier, the account issuer 112 routing number and encrypted transaction device identifier from database 116 for providing to RFID reader 104 (step 204).

Once RFID transaction device 102 detects the interrogation signal provided by RFID reader 104, counter 118 may increment its counter value (step 206). Counter 118 value may be incremented by an amount predetermined by account issuer 112 (e.g., value amount to be incremented). The resulting counter 118 value after incrementing is the total transactions counted value.

Upon determining the total transactions counted value, RFID transaction device 102 may provide the total transactions counted value, the encrypted transaction device 102 identifier, and the account issuer 112 routing number to RFID reader 104 via RF transmission (step 208). RFID reader 104 may, in turn, convert the transaction device 102 identifier, routing number, and total transactions counted value into merchant POS recognizable format and forward the converted information to merchant POS 106 (step 210). The merchant system including POS 106 may then provide a transaction request to acquirer 110 via host network 106. The transaction request may include the information received from transaction device 102 along with information (e.g., amount, number of product, product/service identifier) concerning the transaction requested to be completed (step 216). The transaction request may include information relative to RFID reader 104.

Acquirer 110 may receive the transaction request and forward the transaction request to the appropriate account issuer 112 in accordance with the routing number provided (step 218). Account issuer 112 may then identify that a transaction request is being provided that relates to a transaction device. For example, merchant POS 106 may provide a code appended to the transaction request specially configured for identifying a transaction device transaction which may be recognized by account issuer 112. Alternatively, the transaction device identifier, or a portion thereof, may be identified by account issuer 112 as originating with a RFID transaction device 102.

In one exemplary embodiment, account issuer 112 receives transaction device 102 and checks to see if the transaction device identifier corresponds to a valid transaction account maintained on account issuer 112 system (step 220). For example, account issuer 112 may receive the encrypted transaction device identifier and locate the corresponding decryption key relating to the transaction account. If the encrypted identifier is invalid, such as, for example, when account issuer 112 is unable to locate the corresponding decryption key, account issuer 112 may provide a "Transaction Invalid" message to POS 106 (step 228). Transaction device 102 user may then be permitted to provide an alternate means of satisfying the transaction, or the transaction is ended (step 230).

If the RFID transaction device encrypted identifier corresponding decryption key is located, the encrypted identifier is considered "valid" and account issuer 112 may then use the corresponding decryption key to "unlock" or locate the transaction device account correlative to transaction device 102. Account provider 112 may then retrieve all information relating to the usage limits which have been predetermined by account issuer 112. Account issuer 112 may be able to determine if a particular transaction device 102 has reached its limit of available transactions.

For example, account issuer 112 may check to see if the total transactions counted value equals or exceeds the maximum transactions allowed (step 224). If the maximum transactions allowed have been reached then the counter value is met or exceeded, and the transaction is considered "invalid." As such, account issuer 112 may then provide a "Transaction Invalid" message to POS 106 (step 228). In addition, account issuer 112 may determine whether the total transactions counted value is the next expected value. If not, then the transaction is considered "invalid" and account issuer 112 may also provide a "Transaction Invalid" message to POS 106 (step 228). Transaction device 102 user may then be permitted to provide alternate means of completing the transaction (step 226) or the transaction is ended.

Alternatively, where the total transactions counted value does not exceed or meet the maximum transactions allowed value, the counter value is considered valid and a "Transaction Valid" message is sent to merchant POS 106 (step 230). The merchant may then complete the transaction under business as usual standards as are employed by the merchant.

In accordance with the various embodiments described, the present invention addresses the problem of securing a RF transaction completed by a RFID transaction device. The invention provides a system and method for an account issuer to determine if the RFID transaction device is a valid device for completing a transaction on a RF transaction system. The account issuer can determine whether the transaction device is valid by verifying the transaction device counter, and encryption identifier. It should be noted, however, that the present invention contemplates various arrangements wherein the RFID reader may also be validated.

Figure 3:
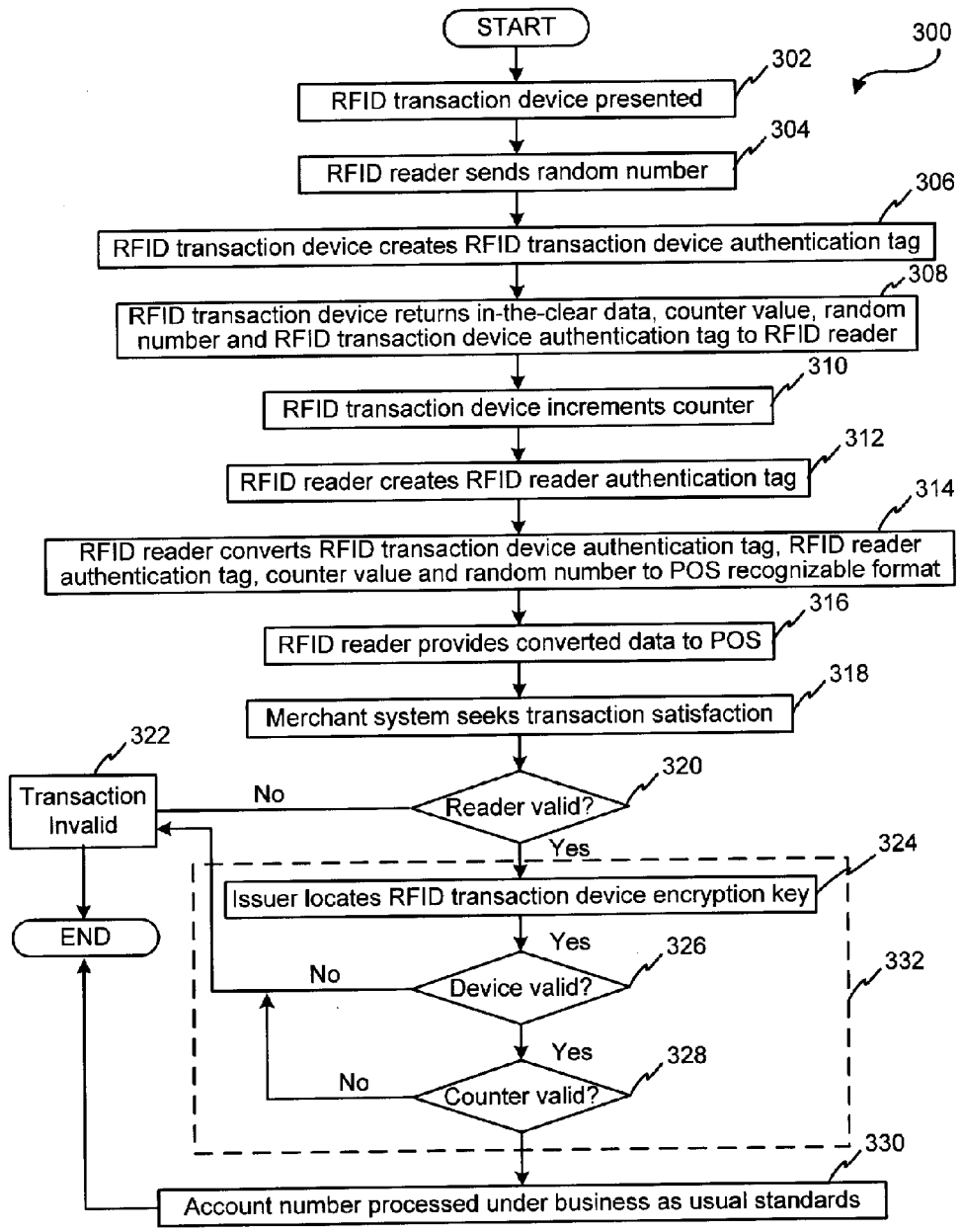
FIG. 3 depicts a flow diagram of an exemplary RFID transaction device and RFID reader authentication flow chart useful with this invention.

FIG. 3 illustrates another method 300 for usage of the RFID transaction device counter 118 value for securing a RF transaction. In accordance with the method depicted, RFID reader 104 includes a random number generator 120, for producing a random number to be used in the secure transactions. Random number generator 120 may be any conventional random number generator as is found in the art.

Method 300 may begin when a user presents RFID transaction device 102 for transaction completion (step 302). The user may, for example, place RFID transaction device 102 into the interrogation zone provided by RFID reader 104. The interrogation zone may be the area or zone defined by the interrogation signal cast by RFID reader 104.

Upon presentment of transaction device 102, RFID reader 104 may provide the random number to RFID transaction device 102. RFID transaction device 102 may receive the random number and use it to create a RFID transaction device authentication tag (step 306). RFID transaction device 102 may receive the random number and use the random number, the counter value, transaction account number and the RFID transaction device encryption key to create a RFID transaction device authentication tag.

RFID transaction device 102 may provide the RFID transaction device authentication tag to RFID reader 104. RFID transaction device 102 may also provide in-the-clear data, the counter value, random number to RFID reader 104, along with the RFID transaction device authentication tag (step 308). RFID transaction device processor 114 may increment counter 118 using any of the incrementing methods discussed above (step 310).

RFID reader 104 may receive the data provided by RFID transaction device 102, and use the data to create a RFID reader authentication key using a RFID reader encryption key (step 312). RFID reader 104 may convert the in-the-clear data, random number, counter value, RFID transaction device authentication tag, and RFID reader authentication tag into a format readable by POS 106 (step 314) and provide the converted data to POS 106 (step 316).

POS 106 may seek satisfaction of the transaction (step 318). For example, POS 106 may form a transaction request using the data received from RFID transaction device 102, and RFID reader 104 encryption key and forward the transaction request to acquirer 110 who may forward the transaction request to account issuer 112 using the routing number.

Account issuer 112 may receive the transaction request and verify that RFID reader 104 and RFID transaction device 102 are valid. Account issuer 112 may validate the RFID reader authentication tag by decrypting the RFID reader authentication tag using a RFID reader encryption key stored on an account issuer database (not shown) (step 320). If the decryption is unsuccessful, then issuer system 112 may provide a "Transaction Invalid" message to POS 106 (step 322) and the transaction is terminated. Alternatively, if decryption is successful, issuer system 112 may seek to validate the RFID transaction device authentication tag (step 332).

For example, account issuer 112 may use the RF transaction device account number to locate a RFID transaction device encryption key stored on issuer 112 database (step 324) and use the RFID transaction device encryption key to decrypt the RFID transaction device authentication tag (step 326). If decryption is unsuccessful then issuer system 112 may provide a "Transaction Invalid" message to POS 106 (step 322) and the transaction is terminated. Alternatively, if the decryption is successful, then issuer system 112 may validate the counter value (step 328). Issuer system 112 may compare the counter value to an expected counter value. In another exemplary embodiment, issuer system 112 may subject the counter value received from RFID transaction device 102 to an algorithm the results of which are validated against an expected counter value.

If the counter value is unsuccessfully validated, then issuer system 112 may provide a "Transaction Invalid" message to POS 106. Otherwise, issuer system 112 may process the RFID transaction account number under business as usual standards (step 330). In this way, the transaction is secured using a counter, by using the counter to validate a RFID transaction device authentication tag and a RFID reader authentication tag.

Figure 4:
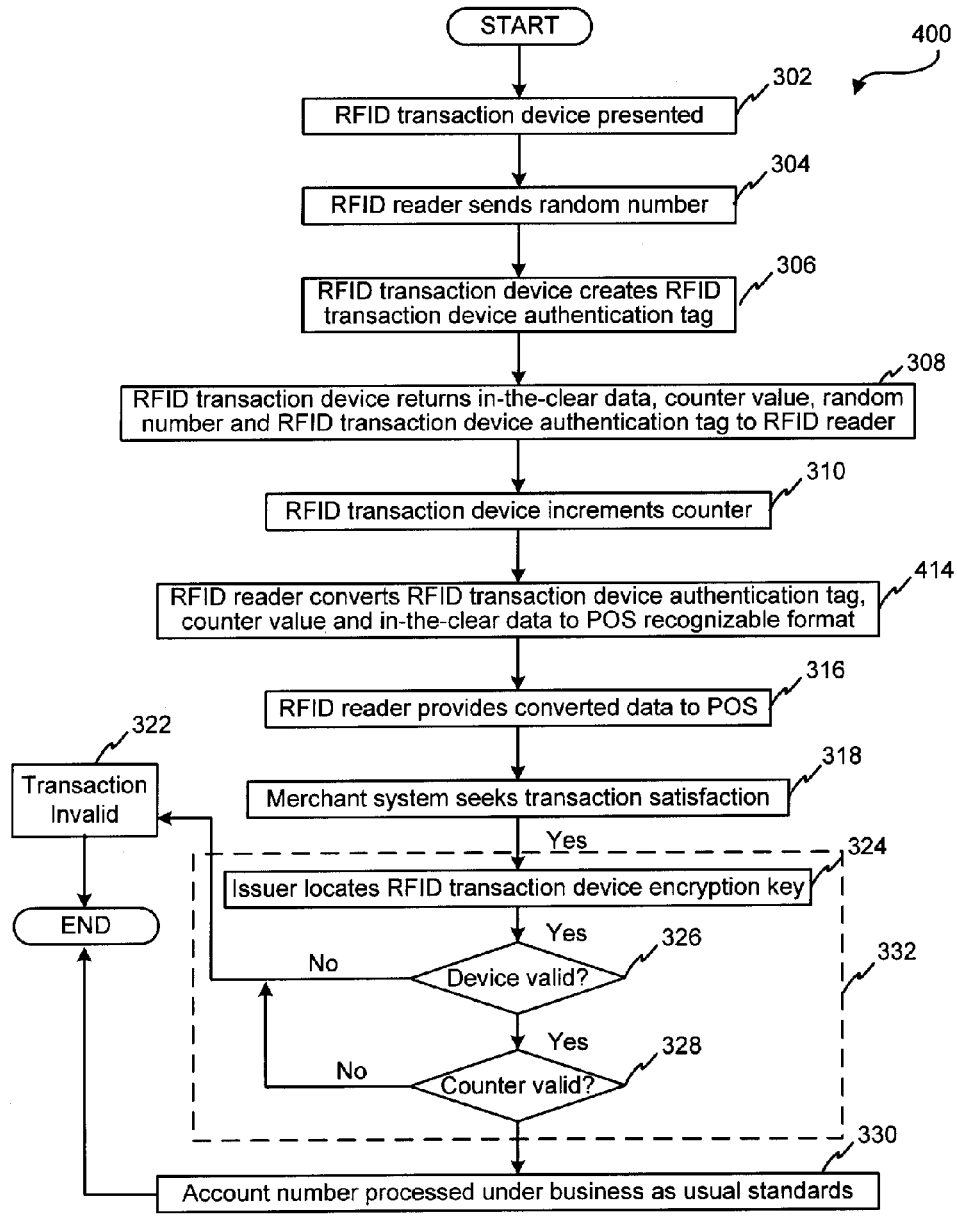
FIG. 4 depicts a flow diagram of an exemplary RFID transaction device authentication flow diagram useful with this invention.

FIG. 4 illustrates another exemplary embodiment of the present invention wherein RFID transaction device 102 is validated using the counter value. In this exemplary embodiment, RFID transaction device 102 is presented (step 302) and RFID reader 104 sends a random number to RFID transaction device 102 (step 304). RFID transaction device 102 receives the random number and creates a RFID transaction device authentication tag using the random number, the in-the-clear data, and a counter value (step 306). RFID transaction device 102 may then provide the RFID transaction device authentication tag, random number, counter value, and in-the-clear data to RFID reader 104 (step 308). RFID transaction device 102 may increment the counter value by a predetermined value (step 310). Alternatively, RFID reader 104 may provide a signal to transaction device 102 for use in incrementing the counter value.

RFID reader 104 may receive the RFID transaction device authentication tag, in-the-clear data and counter value and convert the counter value, in-the-clear data and RFID transaction device authentication tag to a merchant POS 106 format (step 414). Merchant POS 106 may then provide the data received from RFID reader 104 to issuer system 112 (step 316) for transaction satisfaction (step 318). Issuer system 112 may receive the data and verify the RFID transaction device authentication (step 332). For example, issuer system 112 may validate the RFID transaction authentication tag and the counter value in accordance with steps 324-330.

Figure 5:
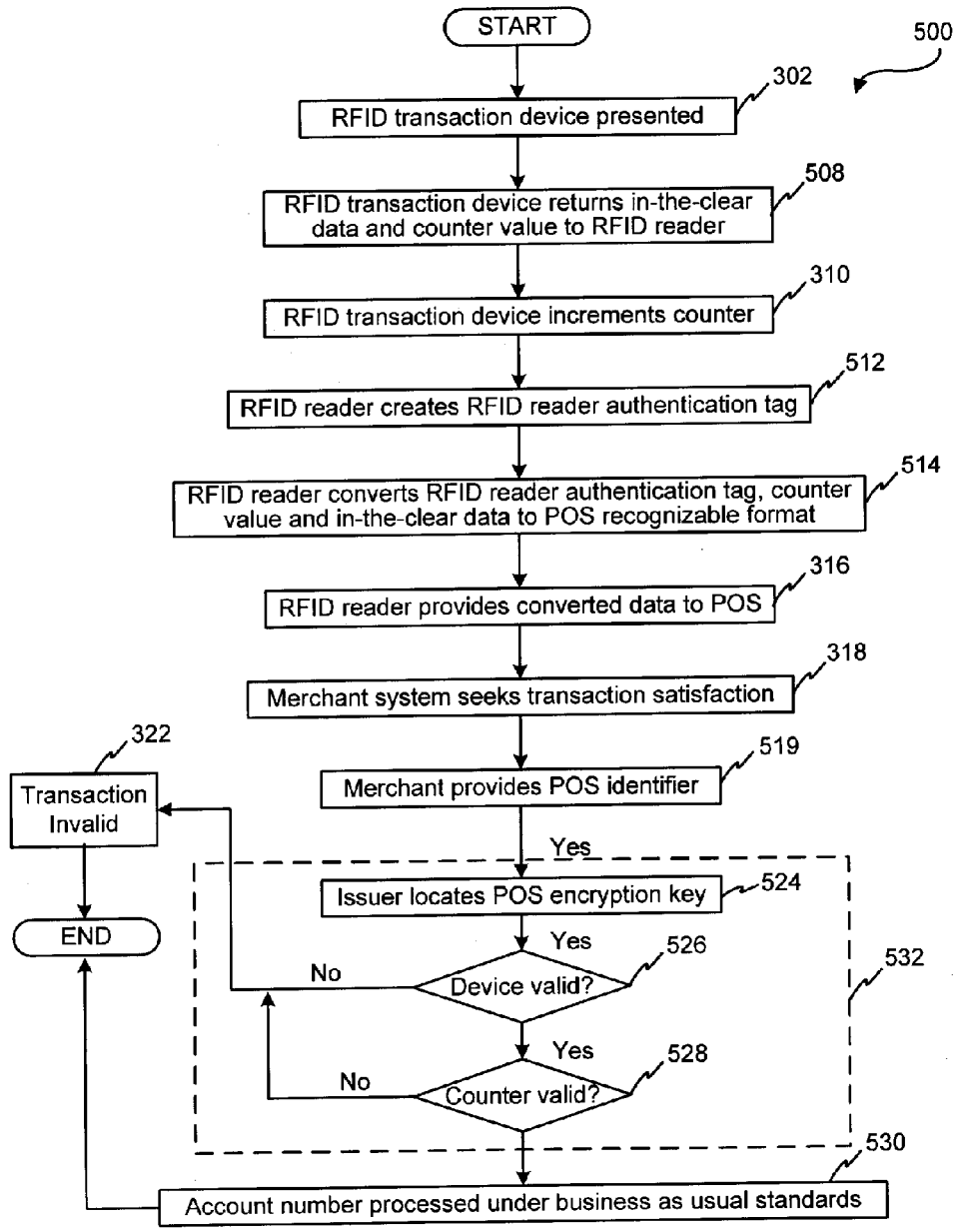
FIG. 5 depicts a flow diagram of an exemplary RFID reader authentication flow diagram useful with this invention.

Under yet another embodiment, FIG. 5 illustrates an aspect of the invention wherein RFID reader 104 is validated, when RFID transaction device 102 is not. According to the invention RFID transaction device 102 is validated using the counter value. In this exemplary embodiment, RFID transaction device 102 is presented for transaction completion (step 302). RFID transaction device 102 may then provide the counter and the in-the-clear data to RFID reader 104 (step 508). RFID transaction device 102 may increment the counter value by a predetermined value (step 310).

RFID reader 104 may receive the in-the-clear data and the counter value and prepare RFID reader authentication tag using a RFID reader encryption key (step 512). RFID reader 104 may then convert the in-the-clear data and RFID reader authentication tag to a merchant POS 106 format (step 514) and provide the converted data to POS 106 (step 316). Merchant POS 106 may then provide the data received from RFID reader 104 to issuer system 112 for transaction satisfaction (step 318). In one exemplary embodiment, merchant POS 106 may provide issuer system 116 with a POS identifier associated with POS 106 (step 519). Issuer system 116 may then seek to verify RFID reader 104 (step 532). For example, issuer system 112 may receive the POS identifier, and locate a related POS encryption key stored on an issuer system database (step 524). Issuer system 112 may receive the encryption key data and verify the RFID reader authentication tag using the POS encryption key data (step 526). For example, issuer system 112 may validate the RFID transaction authentication tag by attempting to decrypt the RFID reader authentication tag using the POS encryption key (i.e. step 526). If the RFID reader authentication tag is successfully decrypted, then the transaction may be processed under business as usual standards (step 330).

In yet another exemplary embodiment, the counter value is used in conjunction with a routing number to secure a RFID transaction. RIFD transaction device 102 provides the routing number to POS 106 which may use the routing number to authenticate (e.g., validate) RFID transaction device 102 and/or decrypt an encrypted transaction account data. Under this method, and undetected by POS 106, the transaction device account number and expiration date (e.g., payload) is encrypted and placed in the cryptogram field of the message provided by RFID reader 104 to POS 106. Issuer system 112 may receive the routing number and the encrypted transaction account data (e.g., transaction account number and expiration date), and use the routing number to validate transaction device 102, or account number.

Figure 6:
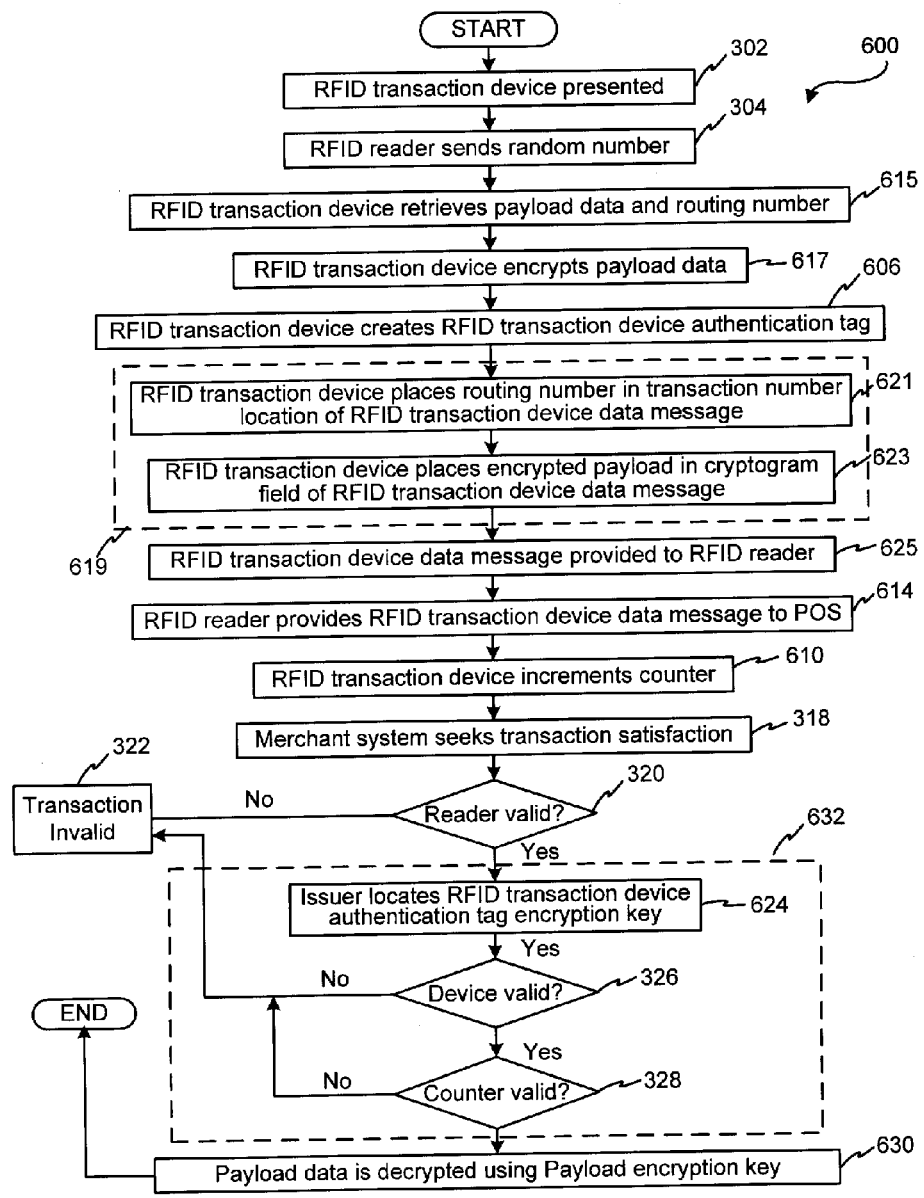
FIG. 6 depicts a flow diagram of an exemplary RFID transaction securing method using a transaction account routing number useful with this invention.

FIG. 6 depicts an exemplary method 600 for using the counter value, routing number and encrypted payload to secure a RFID transaction. RFID transaction device 102 may be presented to RFID reader 104 for transaction completion (step 302), and RFID reader 104 may send a random number to RFID transaction device 102 (step 304). RFID transaction device 104 may receive the random number and retrieve the transaction account number and expiration date (e.g., payload data) associated with RFID transaction device 102, and the routing number associated with the payload data (step 615). RFID transaction device 102 may encrypt the payload (step 617) and create a RFID transaction device authentication tag using the random number, routing number associated with the transaction account number, the counter value, and encrypted payload data (step 606). RFID transaction device 102 may form a RFID transaction device data message including the RFID transaction device authentication tag, counter value, encrypted payload and routing number (step 619). RFID transaction device 102 may place the routing number in a location ordinarily recognizable by POS 106 as the transaction account number (step 621). In this way, POS 106 is unaware that the data received in the ordinary transaction number field of the data message is a routing number. Additionally, RFID transaction device 102 may place the encrypted payload in the cryptogram filed of the RFID transaction device data message (step 623). RFID transaction device 102 may provide the data message to RFID reader 104 in the format discussed above (step 625), and RFID reader 104 may provide the data message to POS 106 in any POS recognizable format (step 614). RFID transaction device 102 may then increment the counter value (step 610). The merchant may then seek transaction satisfaction by forwarding the transaction to issuer system 112, for example (step 318).

RFID transaction device 102 may be validated (step 632) by validating the RFID transaction device authentication tag, counter value or the like. For example, issuer system 112 may seek to validate the RFID transaction device authentication tag. Issuer system 112 may, for example, use the routing number to locate a corresponding RFID transaction device authentication tag encryption key stored on issuer 112 database and use the RFID transaction device encryption key to decrypt the RFID transaction device authentication tag (step 624). If decryption is unsuccessful (step 326) then issuer system 112 provides a "Transaction Invalid" message to POS 106 (step 322) and the transaction is terminated. Alternatively, if the decryption is successful (step 326), then issuer system 112 may validate the counter value (step 328). Issuer system 112 may compare the counter value to an expected counter value. In another exemplary embodiment, issuer system 112 may subject the counter value received from RFID transaction device 102 to an algorithm the results of which are validated against an expected counter value.

If the counter value is unsuccessfully validated, then issuer system 112 may provide a "Transaction Invalid" message to POS 106 (step 322). Otherwise, issuer system 112 may process the RFID transaction account number under business as usual standards. In an alternate embodiment, upon validating the counter value and the RFID transaction device authentication tag, issuer system 112 may use the routing number to locate a decryption key for decrypting the encrypted payload (e.g., "payload encryption key") and decrypt the payload accordingly (step 630). Alternatively, the payload encryption key and the RFID authentication tag encryption key may be identical, substantially the same key, or different keys entirely.

Notably, since the routing number may be defined as the card number in the data transmitted from RFID reader 104 to POS 106, issuing system 112 may readily use the routing number to locate appropriate decryption keys. In this way, the transaction is secured using a counter, by using the counter to validate a RFID transaction device authentication tag and a RFID reader authentication tag.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the RFID reader may include a RFID reader encrypted identifier stored in the reader database, which may be validated by the account issuer in similar manner as with the transaction device encrypted identifier. Moreover, the counter may increment the total transactions counted value by the predetermined incremental value at the completion of a successful transaction. In addition, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method for facilitating securing a radio frequency identification (RFID) transaction, the method comprising the steps of:
transmitting a random number from an RFID reader to an RFID transaction device;
creating, in the RFID transaction device, an RFID transaction device authentication tag using at least (a) the random number, (b) a routing number associated with a transaction account, and (c) a stored counter value;
transmitting the RFID transaction device authentication tag to the RFID reader;
incrementing the stored counter value in the RFID transaction device;
transmitting a transaction request for verification, the transaction request being formed from at least the RFID transaction device authentication tag and the stored counter value; and
processing the transaction request, wherein at least one of the RFID transaction device authentication tag and the stored counter value is verified.

2. The method of claim 1, further comprising converting the RFID transaction device authentication tag, the stored counter value, the random number, and the transaction account payload data in accordance with a merchant point of sale (POS) recognized format and transmitting the converted RFID transaction device authentication tag, the converted counter value, the converted random number, and the converted transaction account payload data.

3. The method of claim 2, wherein the merchant POS recognized format is ISO/IEC 8583 compatible.

4. The method of claim 2, wherein the merchant POS recognizable format includes a cryptogram field, and wherein the encrypted transaction account payload data is stored in the cryptogram field when converted to merchant POS recognizable format.

5. The method of claim 1, wherein, in the step of incrementing the stored counter value, the stored counter value is incremented by a random amount.

6. The method of claim 1, wherein, in the step of incrementing the stored counter value, the stored counter value is incremented by a predetermined amount.

7. The method of claim 1, wherein the step of creating the RFID transaction device authentication tag uses at least the random number, the routing number associated with a transaction account, the stored counter value, and transaction account payload data.

8. The method of claim 7, wherein the transaction account payload data is encrypted.

9. The method of claim 8, wherein the RFID transaction device authentication tag is transmitted in an RFID transaction device data message, the RFID transaction device data message comprises the RFID transaction device authentication tag and at least one of the stored counter value, the routing number, and the encrypted transaction account payload data.

10. The method of claim 9, wherein the verification of the RFID transaction device authentication tag comprises:
locating an RFID transaction device authentication tag encryption key; and
decrypting the RFID transaction device authentication tag using the RFID transaction device authentication tag encryption key.

11. The method of claim 10, wherein a "Transaction Invalid" message is provided if the decrypting step is unsuccessful.

12. The method of claim 10, wherein the RFID transaction device authentication tag encryption key is substantially similar to a transaction account payload encryption key.

13. The method of claim 9, wherein the verification of the stored counter value comprises comparing the stored counter value to an expected counter value.

14. The method of claim 9, further comprising the steps of:
locating a transcription account payload decryption key, using the routing number, for decrypting the encrypted transaction account payload data; and
decrypting the encrypted transaction account payload data.

15. The method of claim 1, wherein the RFID transaction device authentication tag is transmitted in an RFID transaction device data message, the RFID transaction device data message comprises the RFID transaction device authentication tag and at least one of the stored counter value, the routing number, and transaction account payload data.

16. A system configured to facilitate securing a radio frequency identification (RFID) transaction, the system comprising:
an RFID transaction device, an RFID reader and an issuer system, the RFID transaction device comprising:
an RFID transaction device database, the RFID transaction device database is configured to store transaction account payload data, a routing number associated with a transaction account;
an RFID transaction device counter, the RFID transaction device counter having a stored counter value; and
an RFID transaction device processor, the RFID transaction device processor being configured to:
receive a random number;
create an RFID transaction device authentication tag using at least (a) the random number, (b) the routing number, and (c) the stored counter value;
transmit the RFID transaction device authentication tag; and
increment the stored counter value;
the RFID reader being configured to:
transmit the random number to the RFID transaction device;
receive the RFID transaction device authentication tag from the RFID transaction device; and
transmit at least the RFID transaction device authentication tag and the stored counter value;
the issuer system being configured to:
receive a transaction request, the transaction request being formed from at least the RFID transaction device authentication tag and the stored counter value; and
process the transaction request, wherein the issuer system verifies at least one of the RFID transaction device authentication tag and the stored counter value.

17. The system of claim 16, wherein the RFID transaction device authentication tag is created using at least the random number, the routing number, the stored counter value, and the transaction account payload data.

18. The system of claim 17, wherein the transaction account payload data is encrypted.

19. The system of claim 18, wherein the RFID transaction device processor is further configured to create an RFID transaction device data message, the RFID transaction device data message comprises the RFID transaction device authentication tag and at least one of the stored counter value, the routing number and the encrypted transaction account payload data.

20. The system of claim 19, wherein the issuer system is configured to locate an RFID transaction device authentication tag and decrypt the RFID transaction device authentication tag using the RFID transaction device authentication tag encryption key.

21. The system of claim 20, wherein the issuer system is configured to provide a "Transaction Invalid" message if the decryption of the RFID transaction device authentication tag is unsuccessful.

22. The system of claim 19, wherein the issuer system is configured to compare the stored counter value to an expected counter value.

23. The system of claim 19, wherein the issuer system is configured to locate a transaction account payload decryption key and decrypt the encrypted transaction account payload data.

24. The system of claim 16, wherein the RFID transaction device processor is further configured to create an RFID transaction device data message, the RFID transaction device data message comprises the RFID transaction device authentication tag and at least one of the stored counter value, the routing number and the transaction account payload data.

* * * * *

UNITED STATES PATENT AND TRADEMARK OFFICE
CERTIFICATE OF CORRECTION

| | | |
|---|---|---|
| PATENT NO. | : 7,312,707 B1 | |
| APPLICATION NO. | : 10/905006 | |
| DATED | : December 25, 2007 | |
| INVENTOR(S) | : Fred Bishop et al. | |

It is certified that error appears in the above-identified patent and that said Letters Patent is hereby corrected as shown below:

On the Title page, item 63 please correct the related U.S. Application to read as follows:

Continuation-in-part of application No. 10/711,720 filed 9/30/2004
'720 is Non-Provisional of 60/507,803 filed 9/30/2003
'720 is a Continuation-in-Part of 10/708,545 filed 3/10/2004
'545 is a Continuation-in-Part of 10/340,352 filed 7/10/2003
'352 is a Non-Provisional of 30/396,577 filed 7/16/2005
'545 is also a Continuation-in-Part of 10/192,488 filed 7/9/2002 now Patent No. 7,239,226 issued 7/3/2007
'488 is a Non-Provisional of 60/304,216 filed 7/10/2001

Please replace the Cross-Reference to Related Applications paragraph with the following:

This application is a continuation-in-part and claims priority to U.S. Application No. 10/711,720 entitled "SYSTEMS AND METHODS FOR MANAGING MULTIPLE ACCOUNTS ON A RF TRANSACTION DEVICE USING SECONDARY IDENTIFICATION INDICIA" filed on September 30, 2004 (the '720 application is a non-provisional of and claims priority to U.S. Provisional Application No. 60/507,803 entitled "SYSTEM AND METHOD FOR CONTACTLESS SECURITY" filed on September 30, 2003); the '720 application is also a continuation-in-part of and claims priority to U.S. Patent Application No. 10/708,545 entitled "SYSTEM AND METHOD FOR SECURING RF TRANSACTIONS USING A RADIO FREQUENCY IDENTIFICATION DEVICE INCLUDING A TRANSACTIONS COUNTER" filed on March 10, 2004; the '545 application is a continuation-in-part of and claims priority U.S. Patent Application No. 10/340,352 entitled "SYSTEM AND METHOD FOR INCENTING PAYMENT USING RADIO FREQUENCY IDENTIFICATION IN CONTACT AND CONTACTLESS TRANSACTIONS", filed on January 10, 2003 (the '352 is a non-provisional application of and claims priority to U.S. Provisional Application No. 60/396,577 entitled "SYSTEM AND METHOD FOR PAYMENT USING RADIO FREQUENCY IDENTIFICATION IN CONTACT AND CONTACTLESS TRANSACTIONS" filed on July 16, 2002); (continued on page 2)

UNITED STATES PATENT AND TRADEMARK OFFICE
CERTIFICATE OF CORRECTION

PATENT NO.        : 7,312,707 B1
APPLICATION NO.   : 10/905006
DATED             : December 25, 2007
INVENTOR(S)       : Fred Bishop et al.

It is certified that error appears in the above-identified patent and that said Letters Patent is hereby corrected as shown below:

(continued from page 1) the '545 is also a continuation-in-part of and claims priority to U.S. Patent Application 10/192,488 entitled "SYSTEM AND METHOD FOR PAYMENT USING RADIO FREQUENCY IDENTIFICATION IN CONTACT AND CONTACTLESS TRANSACTIONS" filed on July 9, 2002 and issued as U.S. Patent No. 7,239,226 on July 3, 2007 (the '488 application is a non-provisional of and claims priority to U.S. Provisional App. No. 60/304,216 entitled "SYSTEM AND METHOD FOR RFID PAYMENTS" filed on July 10, 2001) all of which are incorporated herein by reference.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,312,707 B1 | Page 1 of 2 |
| APPLICATION NO. | : 10/905006 | |
| DATED | : December 25, 2007 | |
| INVENTOR(S) | : Fred Bishop et al. | |

It is certified that error appears in the above-identified patent and that said Letters Patent is hereby corrected as shown below:

On the Title page, item 63 please correct the related U.S. Application to read as follows:

Continuation-in-part of application No. 10/711,720 filed 9/30/2004
'720 is Non-Provisional of 60/507,803 filed 9/30/2003
'720 is a Continuation-in-Part of 10/708,545 filed 3/10/2004
'545 is a Continuation-in-Part of 10/340,352 filed 7/10/2003
'352 is a Non-Provisional of 60/396,577 filed 7/16/2005
'545 is also a Continuation-in-Part of 10/192,488 filed 7/9/2002 now Patent No. 7,239,226 issued 7/3/2007
'488 is a Non-Provisional of 60/304,216 filed 7/10/2001

Please replace the Cross-Reference to Related Applications paragraph with the following:

This application is a continuation-in-part and claims priority to U.S. Application No. 10/711,720 entitled "SYSTEMS AND METHODS FOR MANAGING MULTIPLE ACCOUNTS ON A RF TRANSACTION DEVICE USING SECONDARY IDENTIFICATION INDICIA" filed on September 30, 2004 (the '720 application is a non-provisional of and claims priority to U.S. Provisional Application No. 60/507,803 entitled "SYSTEM AND METHOD FOR CONTACTLESS SECURITY" filed on September 30, 2003); the '720 application is also a continuation-in-part of and claims priority to U.S. Patent Application No. 10/708,545 entitled "SYSTEM AND METHOD FOR SECURING RF TRANSACTIONS USING A RADIO FREQUENCY IDENTIFICATION DEVICE INCLUDING A TRANSACTIONS COUNTER" filed on March 10, 2004; the '545 application is a continuation-in-part of and claims priority U.S. Patent Application No. 10/340,352 entitled "SYSTEM AND METHOD FOR INCENTING PAYMENT USING RADIO FREQUENCY IDENTIFICATION IN CONTACT AND CONTACTLESS TRANSACTIONS", filed on January 10, 2003 (the '352 is a non-provisional application of and claims priority to U.S. Provisional Application No. 60/396,577 entitled "SYSTEM AND METHOD FOR PAYMENT USING RADIO FREQUENCY IDENTIFICATION IN CONTACT AND CONTACTLESS TRANSACTIONS" filed on July 16, 2002); (continued on page 2)

UNITED STATES PATENT AND TRADEMARK OFFICE
CERTIFICATE OF CORRECTION

PATENT NO. : 7,312,707 B1
APPLICATION NO. : 10/905006
DATED : December 25, 2007
INVENTOR(S) : Fred Bishop et al.

It is certified that error appears in the above-identified patent and that said Letters Patent is hereby corrected as shown below:

(continued from page 1) the '545 is also a continuation-in-part of and claims priority to U.S. Patent Application 10/192,488 entitled "SYSTEM AND METHOD FOR PAYMENT USING RADIO FREQUENCY IDENTIFICATION IN CONTACT AND CONTACTLESS TRANSACTIONS" filed on July 9, 2002 and issued as U.S. Patent No. 7,239,226 on July 3, 2007 (the '488 application is a non-provisional of and claims priority to U.S. Provisional App. No. 60/304,216 entitled "SYSTEM AND METHOD FOR RFID PAYMENTS" filed on July 10, 2001) all of which are incorporated herein by reference.

This certificate supersedes the Certificate of Correction issued December 9, 2008.

Signed and Sealed this

Seventh Day of April, 2009

JOHN DOLL
*Acting Director of the United States Patent and Trademark Office*